United States Patent
Yu et al.

(10) Patent No.: US 12,007,012 B2
(45) Date of Patent: Jun. 11, 2024

(54) REDUCER

(71) Applicant: T-MAX (HANGZHOU) TECHNOLOGY CO., LTD., Zhejiang (CN)

(72) Inventors: Hangfei Yu, Zhejiang (CN); Shipei Yao, Zhejiang (CN); Senbiao Ge, Zhejiang (CN); Haojia Chen, Zhejiang (CN); Haibin Chen, Zhejiang (CN); Xuebo Hu, Zhejiang (CN)

(73) Assignee: T-MAX (HANGZHOU) TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/304,819

(22) Filed: Apr. 21, 2023

(65) Prior Publication Data
US 2023/0341040 A1    Oct. 26, 2023

(30) Foreign Application Priority Data

Apr. 24, 2022 (CN) .......................... 202220960423.8

(51) Int. Cl.
*F16H 57/08* (2006.01)
*F16H 57/00* (2012.01)
*F16H 57/02* (2012.01)

(52) U.S. Cl.
CPC ......... *F16H 57/0006* (2013.01); *F16H 57/02* (2013.01); *F16H 57/08* (2013.01)

(58) Field of Classification Search
CPC ...... F16H 57/0006; F16H 57/02; F16H 57/08; F16H 2057/02082; F16H 57/028; F16H 57/023

USPC ........................ 475/331, 346, 347; 74/606 R
See application file for complete search history.

(56) References Cited

U.S. PATENT DOCUMENTS

| | | | | |
|---|---|---|---|---|
| 4,503,719 A * | 3/1985 | Hamano | ................. | F02N 15/06 74/411 |
| 4,680,979 A * | 7/1987 | Morishita | ............... | F02N 15/06 74/411 |
| 4,848,172 A * | 7/1989 | Morishita | ............. | F02N 15/046 475/345 |
| 8,769,819 B2 * | 7/2014 | Paelicke | ................. | F16H 57/08 475/903 |

FOREIGN PATENT DOCUMENTS

WO      WO9008879 A1 *   8/1990

* cited by examiner

*Primary Examiner* — Roger L Pang
(74) *Attorney, Agent, or Firm* — David D. Brush; Westman, Champlin & Koehler, P.A.

(57) ABSTRACT

The present disclosure relates to a reducer. The reducer includes a casing, an internal ring gear and an elastic cushion. The casing has an inner circumferential wall provided with a first limiting part. The internal ring gear is arranged in the casing and has an outer circumferential wall provided with a second limiting part. The first limiting part is fitted with the second limiting part to limit rotation of the internal ring gear. The elastic cushion has at least a portion located between the second limiting part and the inner circumferential wall of the casing and abutting against the second limiting part and the inner circumferential wall of the casing.

19 Claims, 4 Drawing Sheets

REDUCER

CROSS-REFERENCE TO RELATED APPLICATIONS

This application claims priority to and benefits of Chinese Patent Application Serial No. 202220960423.8, filed with China National Intellectual Property Administration on Apr. 24, 2022, the entire content of which is incorporated herein by reference.

FIELD

The present disclosure relates to the field of car winch technologies, and more particularly to a reducer.

BACKGROUND

Cars use their own engine to drive a car winch, and speed reduction between the engine and the winch is performed by a reducer. The reducer includes a first stage planetary gear set, a second stage planetary gear set, a third stage planetary gear set and other components. When the car winch winds up or winds out a rope, noise of 85 dB-95 dB will be generated. According to detections, it is found that the noise is mainly generated by the first stage planetary gear set of the reducer during operation. In the related art, an internal ring gear of the reducer is integrally formed and fixed on a casing of the reducer by cold extrusion, and the first stage planetary gear has large mechanical vibration during operation, generating extremely loud noise.

SUMMARY

A reducer according to embodiments of the present disclosure includes a casing, an internal ring gear and an elastic cushion. The casing has an inner circumferential wall provided with a first limiting part. The internal ring gear is arranged in the casing and has an outer circumferential wall provided with a second limiting part. The first limiting part is fitted with the second limiting part to limit rotation of the internal ring gear. The elastic cushion has at least a portion located between the second limiting part and the inner circumferential wall of the casing and abutting against the second limiting part and the inner circumferential wall of the casing.

Figure 1:
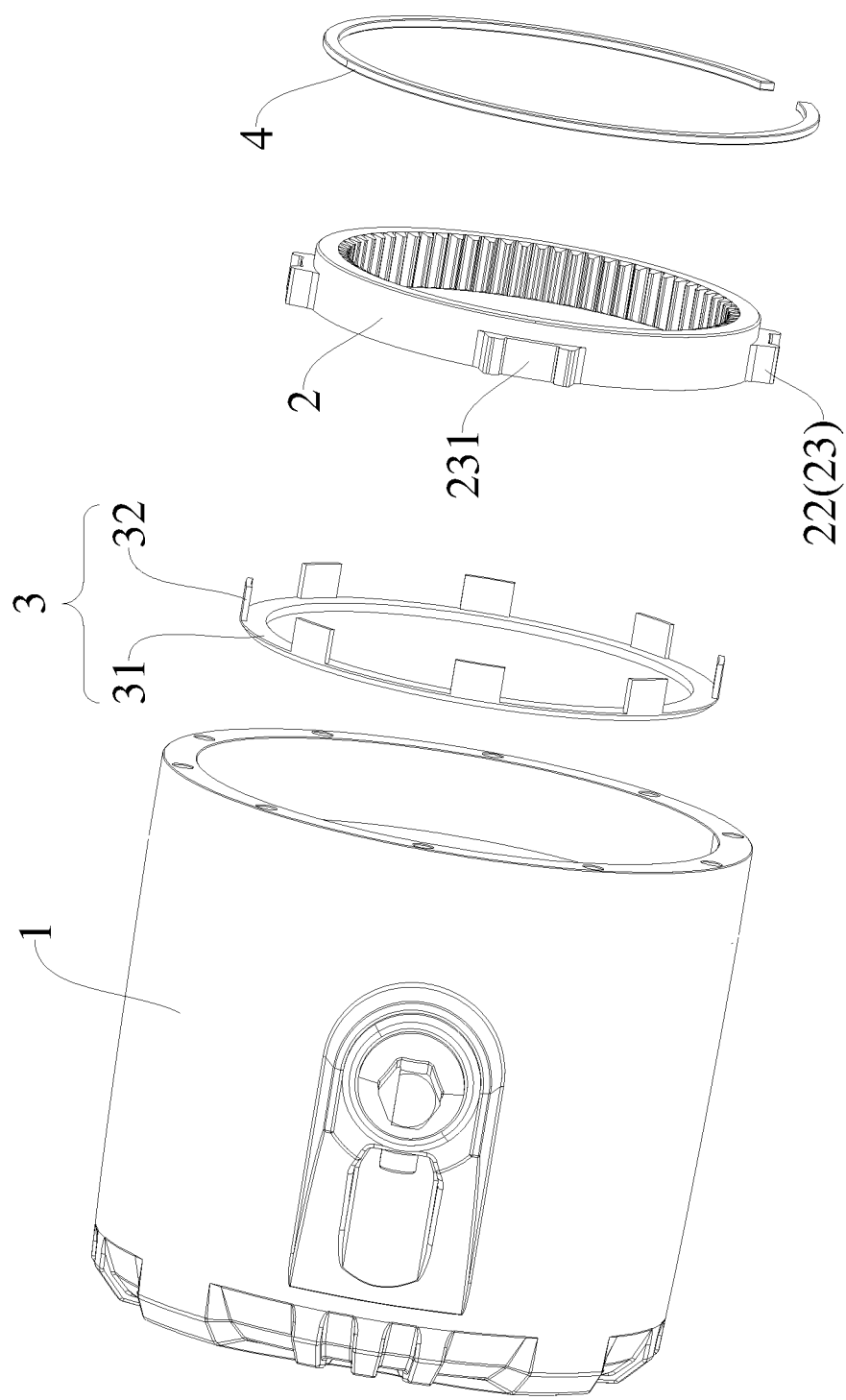
FIG. 1 is an exploded view of a reducer according to an embodiment of the present disclosure.

REFERENCE NUMERALS casing 1, first limiting part 11, first projection 12, inner snapping slot 13, internal ring gear 2, second limiting part 22, second projection 23, snapping slot 231, elastic cushion 3, coupling part 31, filling part 32, internal circlip 4.

DETAILED DESCRIPTION OF ILLUSTRATIVE EMBODIMENTS

Embodiments of the present disclosure will be described in detail below, and examples of the embodiments are shown in accompanying drawings. The embodiments described herein with reference to drawings are explanatory, illustrative, and used to generally understand the present disclosure. The embodiments shall not be construed to limit the present disclosure.

A reducer according to embodiments of the present disclosure will be described below with reference to the accompanying drawings.

As illustrated in FIGS. 1 to 4, the reducer according to embodiments of the present disclosure includes a casing 1, an internal ring gear 2, and an elastic cushion 3. The casing 1 has an inner circumferential wall provided with a first limiting part 11. The internal ring gear 2 is arranged in the casing 1, and the internal ring gear 2 has an outer circumferential wall provided with a second limiting part 22. The first limiting part 11 is fitted with the second limiting part 22 to limit rotation of the internal ring gear 2. The elastic cushion 3 has at least a portion located between the second limiting part 22 and the inner circumferential wall of the casing 1 and abutting against the second limiting part 22 and the inner circumferential wall of the casing 1.

In some embodiments, as illustrated in FIG. 1, the casing 1 has a cylindrical shape. The internal ring gear 2 is arranged in the casing 1, a central axis of the casing 1 and a central axis of the internal ring gear 2 are arranged coaxially. The inner circumferential wall of the casing 1 is provided with the first limiting part 11, and the outer circumferential wall of the internal ring gear 2 is provided with the second limiting part 22. The first limiting part 11 corresponds to the second limiting part 22 in position, and the first limiting part 11 and the second limiting part 22 are fitted with each other to limit the rotation of the internal ring gear 2. In other words, the rotation of the internal ring gear 2 along its own circumferential direction is limited by the first limiting part 11 and the second limiting part 22.

Figure 2:
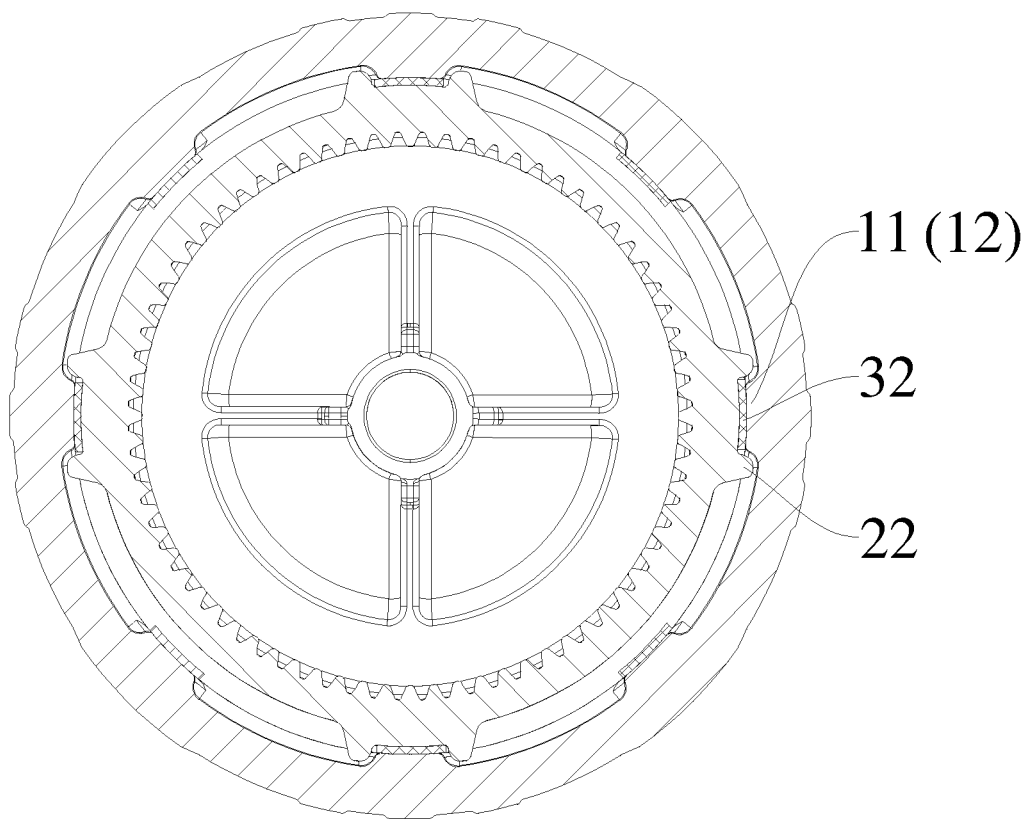
FIG. 2 is a first sectional view of a reducer according to an embodiment of the present disclosure.

Further, as illustrated in FIGS. 1 and 2, there is a gap between the second limiting part 22 and the inner circumferential wall of the casing 1, and at least a portion of the elastic cushion 3 is located in the gap, such that the second limiting part 22 is not in direct contact with the inner circumferential wall of the casing 1, avoiding rigid contact. Furthermore, the elastic cushion 3 has elasticity, such that the second limiting part 22 is in a flexible fit with the inner circumferential wall of the casing 1, to have a vibration reduction effect and further reduce the noise of the planetary gear and the internal ring gear 2 during operation.

It could be understood that, there is a space between the internal ring gear 2 and the inner circumferential wall of the casing 1 for relative movement, to enable the relative movement between the planetary gear and the internal ring gear 2 during operation, to adjust the gap and reduce vibration. Additionally, since the elastic cushion 3 is filled between the second limiting part 22 and the inner circumferential wall of the casing 1, radial vibration between the internal ring gear 2 and the inner circumferential wall of the casing 1 due to machining error of the internal ring gear 2 can be avoided.

The reducer according to embodiments of the present disclosure limits the rotation of the internal ring gear 2 by means of the fitting between the first limiting part 11 and the second limiting part 22. The elastic member is filled between the outer circumferential wall of the internal ring gear 2 and the inner circumferential wall of the casing 1, such that a direct rigid contact between the internal ring gear 2 and the inner circumferential wall of the casing 1 is avoided, the internal ring gear 2 is suspended, and a flexible contact between the outer circumferential wall of the internal ring gear 2 and the inner circumferential wall of the casing 1 is enabled. Furthermore, a planetary gear and the internal ring gear 2 are movable relative to each other during operation, to adjust a gap and reduce vibration.

In some embodiments, as illustrated in FIGS. 1 and 2, the first limiting part 11 is a first projection 12, the second limiting part 22 is a second projection 23, an end face of the second projection 23 away from the internal ring gear 2 in the radial direction of the internal ring gear 2 defines a snapping slot 231, the snapping slot 231 extends in an axial direction of the internal ring gear 2, and at least a portion of the first projection 12 is located in the snapping slot 231.

It could be understood that, during operation of the internal ring gear 2 and the planetary gear, the internal ring gear 2 is a fixed member, and the planetary gear is a mobile member. Therefore, the rotation of the internal ring gear 2 needs to be limited, to meet normal operation of a planetary gear mechanism.

Figure 3:
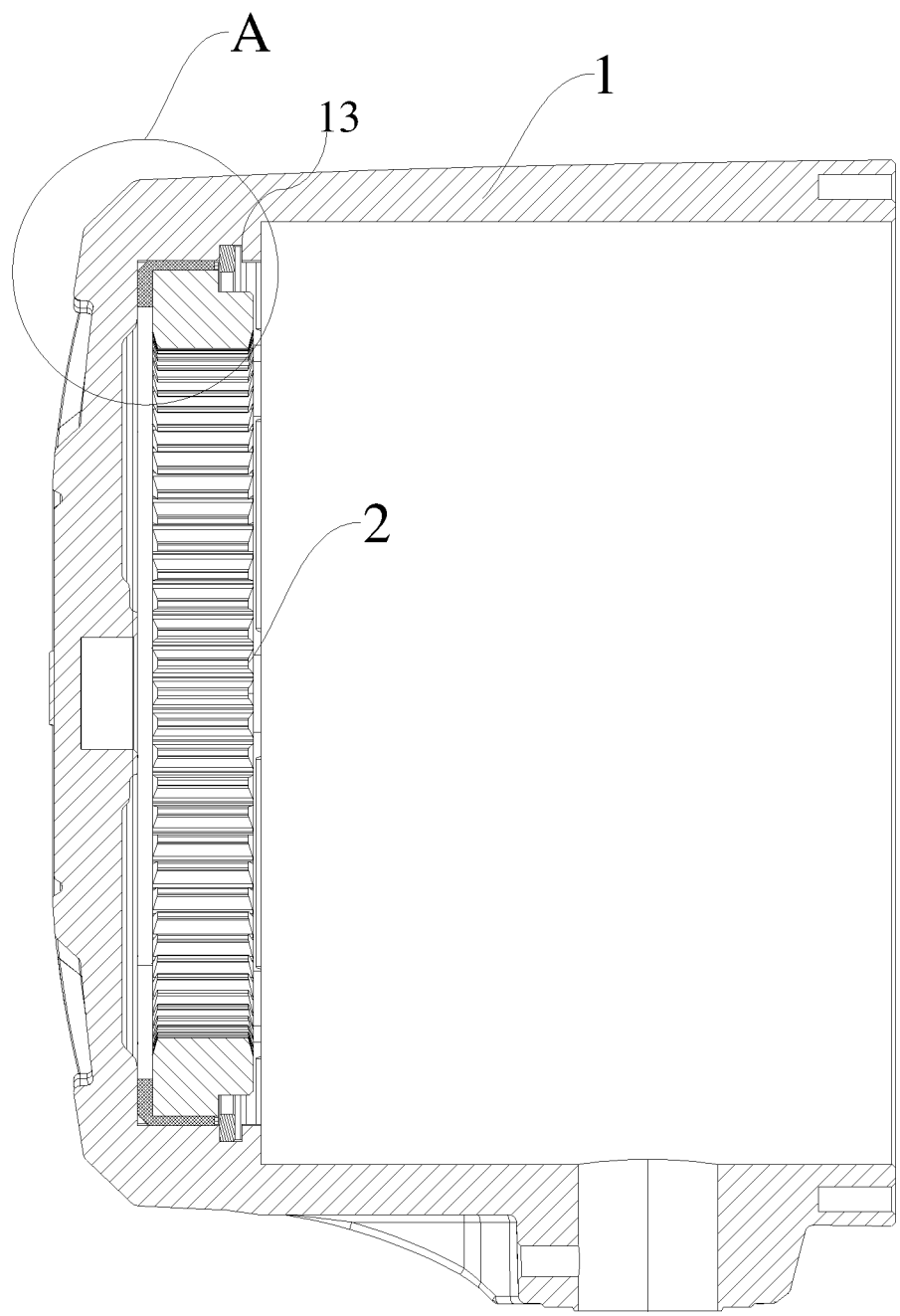
FIG. 3 is a second sectional view of a reducer according to an embodiment of the present disclosure.
Figure 4:
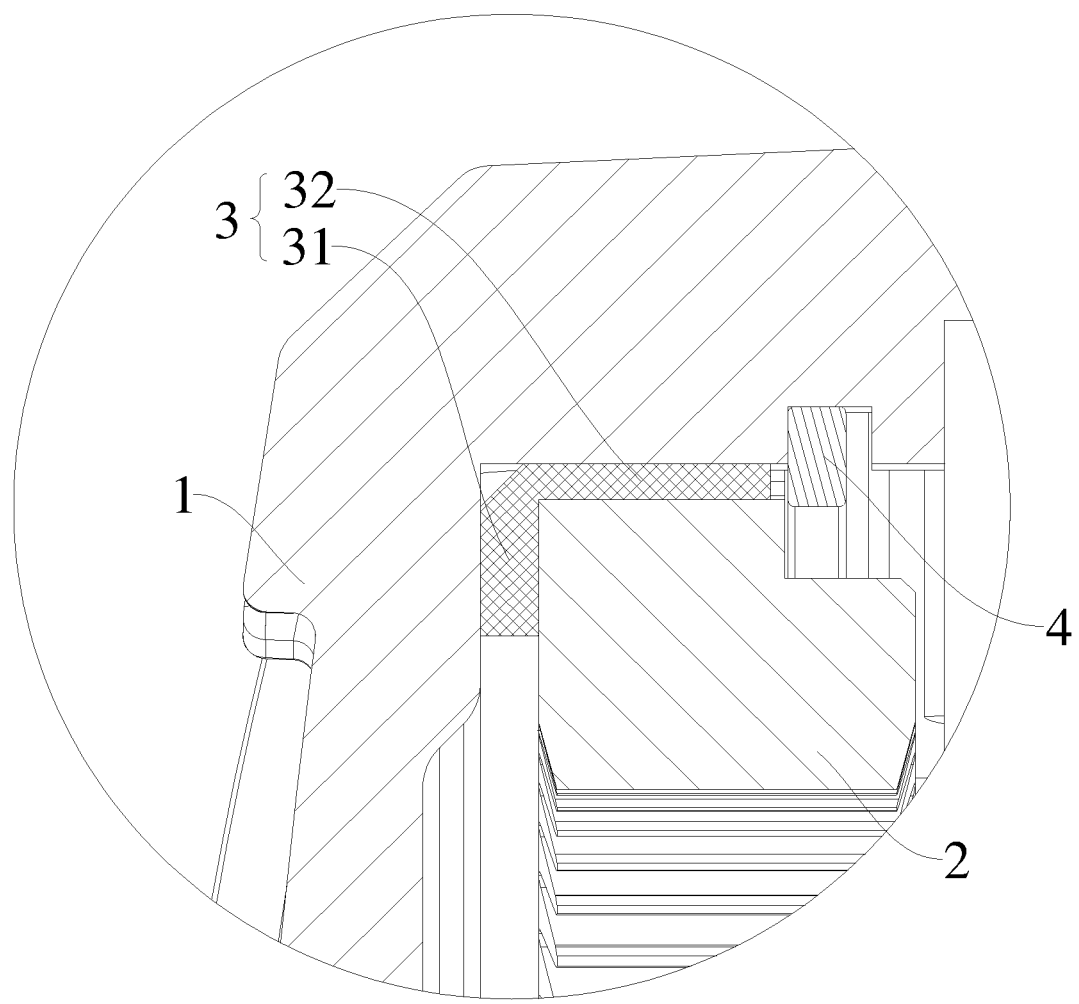
FIG. 4 is an enlarged view of a portion A in FIG. 3.

In some embodiments, as illustrated in FIGS. 2 to 4, the end face of the second projection 23 away from the internal ring gear 2 in the radial direction of the internal ring gear 2 defines the snapping slot 231, the snapping slot 231 extends in the axial direction of the internal ring gear 2, and two ends of the snapping slot 231 are located in two end faces of the second projection 23 in the axial direction of the internal ring gear 2, to improve convenience of assembly of the first projection 12 and the second projection 23. An end of the first projection 12 in the radial direction of the casing 1 is located in the snapping slot 231, and the first projection 12 and the snapping slot 231 are fitted with each other, to limit the rotation of the internal ring gear 2.

In some embodiments, as illustrated in FIGS. 1 to 4, the elastic cushion 3 includes a coupling part 31 and a filling part 32, the coupling part 31 is coupled to the filling part 32, the coupling part 31 is located at a side of the internal ring gear 2 in the axial direction of the internal ring gear 2, at least a portion of the filling part 32 is located in the snapping slot 231, and two end faces of the filling part 32 in the radial direction of the internal ring gear 2 abut against the first projection 12 and a bottom of the snapping slot 231, respectively.

It could be understood that, the coupling part 31 is coupled to the filling part 32, and the coupling part 31 is located at the side of the internal ring gear 2 in the axial direction of the internal ring gear 2, then the filling part 32 is located at a side of the coupling part 31 close to the internal ring gear 2 in the axial direction of the internal ring gear 2, to enable the at least a portion of the filling part 32 to be located in the snapping slot 231.

In at least one embodiment, as illustrated in FIGS. 1 to 4, the filling part 32 is a rectangular rubber block. The rubber block is clamped between the end face of the first projection 11 away from the casing 1 in the radial direction of the casing 1 and the end face of the second projection 23 away from the internal ring gear 2 in the radial direction of the internal ring gear 2. In other words, two end faces of the rubber block in the radial direction of the internal ring gear 2 abut against the end face of the first projection 11 close to the second projection 23 and the end face of the second projection 23 close to the first projection 11, respectively.

In some embodiments, as illustrated in FIG. 2, a plurality of first limiting parts 11 are provided, the plurality of first limiting parts 11 are spaced apart in the circumferential direction of the internal ring gear 2, and any one of the first limiting parts 11 is fitted with the second limiting part 22.

It could be understood that, if one of the plurality of first limiting parts 11 fails, the second limiting part 22 may be fitted with one non-failed first limiting part 11 again, to limit the rotation of the internal ring gear 2.

Further, as illustrated in FIGS. 1 and 2, a plurality of filling parts 32 are provided, and the plurality of filling parts 32 are in one-to-one correspondence with the plurality of first limiting parts 11. Hence, it is ensured that when any one of the first limiting parts 11 fitted with the second limiting part 22 is changed, the fitting relationship between the internal ring gear 2 and the casing 1 is always a flexible contact.

In some embodiments, as illustrated in FIGS. 1 and 2, a plurality of second limiting parts 22 are provided, and the number of the first limiting parts 11 is twice the number of the second limiting parts 22.

In at least one embodiment, as illustrated in FIGS. 1 and 2, eight first limiting parts 11 are provided, eight filling parts 32 are provided, and four second limiting parts 22 are provided. The four second limiting parts 22 are spaced apart in the circumferential direction of the internal ring gear 2. The four second limiting parts 22 are fitted with four first limiting parts 11 of the eight first limiting parts 11, and if the four first limiting parts 11 fail, the four second limiting parts 22 may be fitted with the other four first limiting parts of the eight first limiting parts 11.

In some embodiments, as illustrated in FIGS. 1 to 4, the coupling part 31 has a ring shape, the coupling part 31 has a first end face in an axial direction of the coupling part 31 abutting against an end face of the internal ring gear 2 close to the coupling part 31 in the axial direction of the internal ring gear 2, and a second end face in the axial direction of the coupling part 31 abutting against an inner wall face of the casing 1.

It could be understood that, the plurality of filling parts 32 are all coupled to the coupling part 31, the coupling part 31 is clamped between the internal ring gear 2 and the inner wall face of the casing 1, to prevent the filling part 32 from sliding out from the snapping slot 231 towards a side away from the coupling part 31. Moreover, the integral structure of the elastic cushion 3 also improves assembly convenience.

In at least one embodiment, as illustrated in FIGS. 1 to 3, the coupling part 31 is a rubber ring. The rubber ring has a first end face in the axial direction of the rubber ring abutting against an end face of the internal ring gear 2 close to the coupling part 31 in the axial direction of the internal ring gear 2, and a second end face in the axial direction of the rubber ring abutting against an inner end face of the casing 1 close to the rubber ring in the axial direction of the casing 1.

In some embodiments, the internal ring gear 2 is a first stage internal ring gear 2. It could be understood that, in the reducer of embodiments of the present disclosure, a rubber cushion is arranged between the first stage internal ring gear 2 and the inner circumferential wall and the inner end face of the casing 1, such that the first stage internal ring gear 2 is suspended relative to the casing 1, reducing vibration.

In some embodiments, as illustrated in FIGS. 1 to 4, the reducer further includes an internal circlip 4, the internal circlip 4 is snap-fitted in the inner circumferential wall of the casing 1 and surrounds the internal ring gear 2, the internal circlip 4 is located at a side of the second projection 23 away from the coupling part 31 in the axial direction of the internal ring gear 2, and the internal circlip 4 is configured to limit axial movement of the internal ring gear 2.

As illustrated in FIG. 3, the inner circumferential wall of the casing 1 defines an annular inner snapping slot 13, and the inner snapping slot 13 is located at a side of the second projection 23 away from the coupling part 31 in the axial direction of the internal ring gear 2. The internal circlip 4 is snap-fitted in the inner snapping slot, such that the internal circlip 4 limits the axial movement of the internal ring gear 2.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial" and "circumferential" should be construed to refer to the orientation as then described or as shown in the drawings under discussion. These relative terms are for convenience of description and do not require that the present disclosure be constructed or operated in a particular orientation.

In addition, terms such as "first" and "second" are used herein for purposes of description and are not intended to indicate or imply relative importance or significance. Thus, the feature defined with "first" and "second" may comprise one or more of this feature. In the description of the present disclosure, "a plurality of" means at least two, e.g., two, three or like, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, unless limited otherwise. These having ordinary skills in the art should understand the specific meanings in the present disclosure according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature. While a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout the present disclosure to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. In addition, without conflicting, various embodiments or examples or features of various embodiments or examples described in the present specification may be combined by those skilled in the art.

Although explanatory embodiments have been shown and described, it would be appreciated by those skilled in the art that the above embodiments cannot be construed to limit the present disclosure, and changes, alternatives, and modifications can be made in the embodiments within the scope of the present disclosure.

What is claimed is:

1. A reducer, comprising:
   a casing having an inner circumferential wall provided with a first limiting part;
   an internal ring gear arranged in the casing and having an outer circumferential wall provided with a second limiting part, the first limiting part being fitted with the second limiting part to limit rotation of the internal ring gear; and
   an elastic cushion having at least a portion located between the first limiting part and the second limiting part and abutting against the first limiting part and the second limiting part in a radial direction of the internal ring gear,
   wherein the first limiting part is a first projection, the second limiting part is a second projection, the second projection defines a snapping slot in an end face of the second projection away from the internal ring gear in the radial direction of the internal ring gear, the snapping slot extends in an axial direction of the internal ring gear, and the first projection has at least a portion located in the snapping slot.

2. The reducer according to claim 1, wherein two ends of the snapping slot are located in two end faces of the second projection in the axial direction of the internal ring gear.

3. The reducer according to claim 1, wherein the elastic cushion comprises a coupling part and a filling part, the coupling part is coupled to the filling part, the coupling part is located at a side of the internal ring gear in the axial direction of the internal ring gear, the filling part has at least a portion located in the snapping slot, and the filling part has two end faces abutting against the first projection and a bottom of the snapping slot respectively in the radial direction of the internal ring gear.

4. The reducer according to claim 3, wherein a plurality of first limiting parts are provided and spaced apart in a circumferential direction of the internal ring gear, and one of the first limiting parts is fitted with the second limiting part.

5. The reducer according to claim 4, wherein a plurality of filling parts are provided, the plurality of filling parts are in one-to-one correspondence with the plurality of first limiting parts.

6. The reducer according to claim 4, wherein a plurality of second limiting parts are provided, and the first limiting parts have a number twice a number of the second limiting parts.

7. The reducer according to claim 3, wherein the coupling part has a ring shape, the coupling part has a first end face in an axial direction of the coupling part abutting against an end face of the internal ring gear close to the coupling part in the axial direction of the internal ring gear, and a second end face in the axial direction of the coupling part abutting against an inner wall face of the casing.

8. The reducer according to claim 3, wherein the filling part is a rectangular rubber block.

9. The reducer according to claim 3, wherein the coupling part is a rubber ring.

10. The reducer according to claim 3, further comprises an internal circlip snap-fitted in the inner circumferential wall of the casing and surrounding the internal ring gear, the internal circlip being located at a side of the second projection away from the coupling part in the axial direction of the internal ring gear, the internal circlip being configured to limit an axial movement of the internal ring gear.

11. The reducer according to claim 10, wherein the inner circumferential wall of the casing defines an annular inner snapping slot, the inner snapping slot is located at a side of the second projection away from the coupling part in the axial direction of the internal ring gear, and the internal circlip is snap-fitted in the inner snapping slot.

12. The reducer according to claim 5, wherein the coupling part has a ring shape, the coupling part has a first end face in an axial direction of the coupling part abutting against an end face of the internal ring gear close to the coupling part in the axial direction of the internal ring gear, and a second end face in the axial direction of the coupling part abutting against an inner wall face of the casing.

13. The reducer according to claim 12, wherein the plurality of filling parts are all coupled to the coupling part, and the coupling part is clamped between the internal ring gear and the inner wall face of the casing.

14. The reducer according to claim 1, wherein the casing has a cylindrical shape, and the casing has a central axis coaxial with a central axis of the internal ring gear.

15. The reducer according to claim 1, wherein the internal ring gear is a first stage internal ring gear.

16. The reducer according to claim 1, wherein the internal ring gear is a first stage internal ring gear.

17. The reducer according to claim 2, wherein the internal ring gear is a first stage internal ring gear.

18. The reducer according to claim 3, wherein the internal ring gear is a first stage internal ring gear.

19. The reducer according to claim 4, wherein the internal ring gear is a first stage internal ring gear.

* * * * *